United States Patent
Kuriakose et al.

(10) Patent No.: US 10,002,159 B2
(45) Date of Patent: Jun. 19, 2018

(54) METHOD AND SYSTEM FOR TRANSLATING USER KEYWORDS INTO SEMANTIC QUERIES BASED ON A DOMAIN VOCABULARY

(71) Applicant: Infosys Limited, Bangalore (IN)

(72) Inventors: John Kuriakose, Pune (IN); Sai Deepak Tunuguntla, Andhra Pradesh (IN)

(73) Assignee: Infosys Limited, Bangalore (IN)

( * ) Notice: Subject to any disclaimer, the term of this patent is extended or adjusted under 35 U.S.C. 154(b) by 0 days. days.

(21) Appl. No.: 14/214,070

(22) Filed: Mar. 14, 2014

(65) Prior Publication Data
US 2014/0379755 A1 Dec. 25, 2014

(30) Foreign Application Priority Data
Mar. 21, 2013 (IN) .......................... 1237/CHE/2013

(51) Int. Cl.
*G06F 17/30* (2006.01)
*G06F 17/00* (2006.01)

(52) U.S. Cl.
CPC ................. *G06F 17/3043* (2013.01)

(58) Field of Classification Search
CPC ......... G06F 17/30592; G06F 17/30371; G06F 8/35; G06F 8/30; G06F 8/73; G06F 17/30294; G06F 17/30339; G06F 2216/03; G06F 3/04842; G06F 17/246; G06F 17/30292; G06F 17/30525; G06F 17/30554; G06F 17/30572; G06F 17/30398; G06F 17/30241
See application file for complete search history.

(56) References Cited

U.S. PATENT DOCUMENTS 6,453,312 B1 * 9/2002 Goiffon ............. G06F 17/30643
6,460,043 B1 * 10/2002 Tabbara ............. G06F 17/30392
(Continued)

FOREIGN PATENT DOCUMENTS

WO 2006031466 A2 3/2006

OTHER PUBLICATIONS

Esther Kaufmann et al., "Querix: A Natural Language Interface to Query Ontologies Based on Clarification Dialogs", University of Zurich—Department of Informatics, Nov. 2006.
(Continued)

*Primary Examiner* — Yicun Wu
(74) *Attorney, Agent, or Firm* — LeClairRyan PLLC

(57) ABSTRACT

The embodiments of the present invention provide a computer-implemented method and system for translating user keywords into semantic queries based on domain vocabulary. The system receives the user keywords and search for the concepts. The concepts are transformed into a connected graph. The user keywords are translated into precise access paths based on the information relationship described in conceptual entity relationship models and then converts these paths into logic based queries. It bridges the semantic gap between user keywords and logic based structured queries. It enables users to interact with the semantic system by articulating the information in a structured query language. It improves the relevance of search results by incorporating semantic technology to drive the mechanics of the search solution.

21 Claims, 9 Drawing Sheets

(56) References Cited

U.S. PATENT DOCUMENTS

| | | | |
|---|---|---|---|
| 7,752,243 B2* | 7/2010 | Hoeber | G06F 17/3064 |
| | | | 707/706 |
| 8,195,683 B2* | 6/2012 | Bolivar | G06F 17/30672 |
| | | | 704/257 |
| 8,266,162 B2* | 9/2012 | Cava | G06F 17/3064 |
| | | | 707/755 |
| 8,972,405 B1* | 3/2015 | Chaulk | G06F 17/30194 |
| | | | 707/737 |
| 2004/0181390 A1 | 9/2004 | Manson et al. | |
| 2005/0289124 A1 | 12/2005 | Kaiser et al. | |
| 2008/0104071 A1 | 5/2008 | Pragada et al. | |
| 2008/0235199 A1 | 9/2008 | Li et al. | |
| 2008/0307523 A1 | 12/2008 | Subramanyam et al. | |
| 2010/0063799 A1 | 3/2010 | Jamieson | |

OTHER PUBLICATIONS

Esther Kaufmann, "Talking to the Semantic Web—Natural Language Query Interfaces for Casual End-users", Doctoral Thesis for the Degree of a Doctor in Informatics at the Faculty of Economics, Business Administration and Information Technology of the University of Zurich.

Esther Kaufmann et al., "Web Semantics: Science, Services and Agents on the World Wide Web", Dynamic and Distributed Information Systems Group, University of Zurich, 2010.

* cited by examiner

METHOD AND SYSTEM FOR TRANSLATING USER KEYWORDS INTO SEMANTIC QUERIES BASED ON A DOMAIN VOCABULARY

RELATED APPLICATION DATA

This application claims priority to India Patent Application No. 1237/CHE/2013, filed Mar. 21, 2013, the disclosure of which is hereby incorporated by reference in its entirety.

BACKGROUND

The invention relates generally to fulfilling keyword based search over a semantic repository (RDF Triple store). In particular, the invention relates to a method and system for translating user keywords into semantic queries based on a machine readable domain vocabulary.

Information Retrieval Techniques that facilitate machine based searching and finding information are crucial in assisting commerce and work related tasks in an enterprise. Many business application solutions like Knowledge Management Systems in product support and maintenance centers, Content Analytics and digital publishing platforms, learning and diagnostic support systems in Healthcare rely on Information Retrieval technology to find relevant information from a massive set of documents or work related information products.

The goal of Information Retrieval (IR) is to obtain a ranked set of information resources or documents that are relevant to a user input or query typically expressed as keywords. This is done by devising a suitable system model to represent the information contained within the documents and then matching the user input or the user query with respect to the system model and ranking the documents in the order of relevance to the query.

The quality of the matching depends on the richness of the system model chosen to represent the information content. IR system in use today embodied by web search engines like Google, Yahoo, or even enterprise search like Lucene or SOLR are based on a simplistic full-text bag-of-words model wherein a document is treated as a collection of words or terms. In this model the words in a document are indexed after stripping certain stop-words (like 'a' 'the' 'of' 'on' etc.) and the word or term frequency is computed. The distribution of a term across the entire document collection is thus obtained and drives the interpretation to find relevant document for a set of user keywords. The information model in use in IR systems only examines the occurrence of words or phrases and not its meaning Current system cannot understand how words and phrases are related to semantic concepts or real-world things and how words or phrases are related to each other. Therefore current IR systems cannot make distinguish between varying interpretations of the same word based on its meaning and context. This absence of meaning and context in the system model in existing IR systems and technology can be addressed by relying on a model that relies on meaning based metadata to derive the proper sense of words and phrases.

The current models and interpretation in IR systems provide a list of documents as the results of a search task, for example in the current state if the user input is 'Diabetes drugs for blood pressure patients'. The user information need is best understood as 'Show me drugs that can be used to treat Diabetes when the patient also has high blood pressure'. However, the results from existing IR systems and technology are a set of documents or web pages deemed relevant by the system. Users have to read through the document contents based on highlighted occurrences of the keywords in those documents and extract and assemble useful answers for his/her information need. Users are expected to avoid duplicate information, resolve references and assemble answers they are looking for. This assemble of answers from documents in the result set is a manual task and is time consuming and error prone affecting the productivity of users in current IR systems. In order to address this gap between the granularity of the IR system results which is in the form of documents and the user information requirements which is at a finer granularity level based on the actual content in the documents we believe it is vital to have a more rich and fine-grained model.

Semantic technology represents a new technology stack that provides the technology primitives to annotate data with a precise meaning and context. It also enables rich information models that are closer to user information needs than documents and thus helps break free from the containers that were the limiting factor in the model used in existing IR technology. The semantic technology refers to a suite of models, languages and associated runtime components that include RDF as a basic data model and data representation format knowledge representation languages like OWL or simple knowledge organization system (SKOS), Inference engines, and SPARQL query engines. Semantic technology helps to improve the findability of information relevant to some user need.

This information model at the logical level is composed of two parts a) a disambiguated list of entities each associated to a set of entity types and uniquely identified by an identifier that may be in the form of a URI and/or a long integer value. And b) a set of named relations between these entities expressed using the unique identifiers. These Relations could be used to describe attributes like name or address or date-of-birth and also relations to other defined entities like 'friend-of' or 'is-part-of'. At the physical level this data is typically managed by triple stores or semantic repositories based on the RDF language.

A populated triple store along with the machine readable domain knowledge or domain vocabulary in the form of taxonomy or a richer form of ontology is called a knowledge base. Information may be retrieved from such knowledge bases by providing structured queries in a specific language known as SPARQL. This scenario is similar to the use of Relational Database systems in enterprise applications wherein data is retrieved using structured queries in SQL language.

There is a gap encountered when users with specific information goals attempt to interact with a knowledge base or a semantic system. This gap results from a mismatch between the system query, which has to be expressed in structured SPARQL queries and the user query that is expressed using simple natural language keywords. For most practical purpose and real world use-cases it is not feasible to expect users to specify their information requirement in a structured query language. Users are entrenched into the keyword based search paradigm exemplified by search products like Google.com or Bing.com. This gap is an opportunity for our invention to automatically translate user's natural language keywords into structured semantic queries based on the domain knowledge and the kind of entities and relations present in the semantic repository.

Accordingly, there is a need for a method and system for translating user keywords into semantic queries based on domain vocabulary. Further, there is a need to bridge a gap between user keywords and logic based structured queries by semantic representation of information.

SUMMARY OF THE INVENTION

A computer-implemented method for translating user keywords into semantic queries based on domain vocabulary, the method comprises receiving user keywords from a computer system, searching a concepts for the received user keywords using a conceptual model, transforming the conceptual model into a connected graph, or network, applying one or more transformations to find all possible paths connecting the concepts or the paths having maximum coverage through underlined concepts based on said user keywords, generating structured semantic queries in one or multiple languages from said paths, and searching said query language on triple stores in semantic repository in a knowledge base to find precise matching results for the user keywords, the said knowledge base further having a domain knowledge module to capture background knowledge in the domain using concepts, relations roles and attributes.

A system for translating user keywords into semantic queries based on a domain vocabulary comprising a memory, a processor operatively coupled to the memory. A semantic repository in a knowledge base provided in said memory to store data as elements and triples or quads. A domain module in the knowledge base provided in said memory to capture background knowledge in domain using concepts, relations, roles and attributes. An inference engine in the memory to automatically expand a query term by the processor based on its semantic meaning. A query engine in the memory integrates concepts and relations described by said domain model as a valid atomic term in a query and interpret them over the data based on a closed world assumption or an open world assumption. A search component to accept keywords from users, said processor maps received user keywords with concepts and relations in the domain model, the processor employs a graph search and optimizations based on traversal patterns for finding various paths through said domain model that connects user supplied keywords, the graphs are then converted in to valid queries and said queries are evaluated against said data.

Embodiments of the present invention provide a system and method to translate user key words into precise access paths based on the information relationship described in conceptual entity relationship models and then converts these paths into logic based queries. It bridges the semantic gap between user keywords and logic based structured queries that represent the primary way of retrieving information from semantic representation of information. It enables users to interact with the semantic system that requires information requirements to be articulated in a structured query language since users prefer using simple keywords. It improves the relevance of search results by incorporating semantic technology to drive the mechanics of the search solution.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
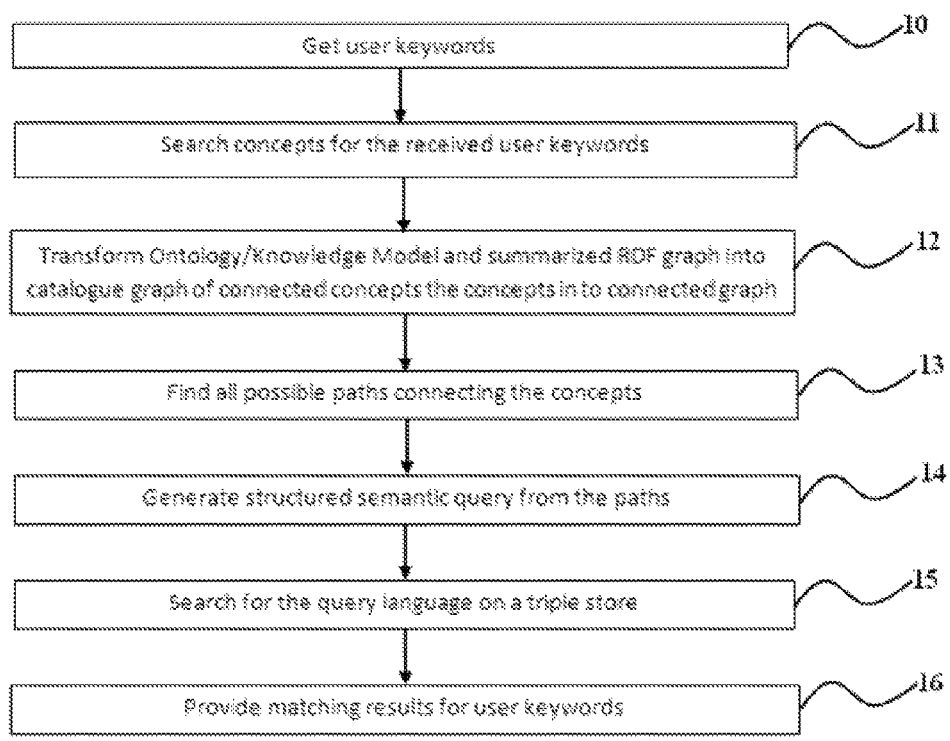
FIG. 1 shows a flow chart for translating user keywords into semantic queries based on domain vocabulary, according to embodiment of the present invention.

A computer-implemented method for translating user keywords into semantic queries based on domain vocabulary is as shown in FIG. 1. The method comprises receiving user keywords from a computer system (10), searching concepts for the received user keywords using a conceptual model (11), transforming the Resource Description Framework (RDF) graph and web Ontology Language (OWL) or any other domain knowledge model into a connected concept graph, or network (12), applying one or more transformations to find all possible paths connecting the concepts or the paths having maximum coverage through underlined concepts based on said user keywords (13), generating structured semantic queries in one or multiple languages from said paths (14), and searching said query language on triple stores in semantic repository in a knowledge base (15) to find precise matching results for the user keywords (16). The knowledge base further includes a domain knowledge module to capture background knowledge in the domain using concepts, relations roles and attributes.

According to present invention, receiving the user keywords from a computer system may include receiving user queries from a local computer or a remote computer or through internet. The SPARQL query is a concrete specification and realization of a structured semantic query language. The domain knowledge in the semantic repository may be modeled by rich n-ary relations instead of simple binary relations. The method further includes summarizing RDF data to OWL type class and computing the distinct count of Subjects and Objects for each predicate to obtain summarized RDF type graph. The summarized RDF type graph for unique combination of a filtered set of predicates along with Source type and Object Type is then augmenting with Ontological graphs for 'rdfs:subClassOf', 'owl:disjointWith' predicates to form the catalog concept graph.

An index of all string literals for entities whether subjects or objects in the RDF graph along with the list of associated RDF types and the associated Universal Resource Identifier (URI) and any other unique identifier for each entity is built. The said string index is further augmented with all of the string labels for Ontological types and predicates available in the domain otology or knowledge model. The combined string index is used to match user input to an Ontology type or predicate or entity identifiers in the RDF data and enables exact and fuzzy matching with spell correct over the string literals in the Triple store.

According to embodiment of the present invention, the method for translating user keywords in to semantic queries further comprises receiving input keywords from the user, searching said keywords in the combined string index of the concept graph and the RDF graph, executing said keywords on entire string index to find the URI's and finding the matches to the user queries in the RDF graph and then getting RDF type of that URI. It includes providing entity types derived from user keywords to the summarized RDF graph to find valid paths connecting all or some these keywords based on graph traversal. The paths found by traversing the summarized RDF graph are ranked based on the number of hops or edges in the path and the count of relations with a specific entity type as subject and a entity type as object and then converting the paths into a structured query language with the use of an optional mapping layer that maps semantic concepts in RDF to the physical data model and executing those queries against a triple store or any other physical data management solution like a RDBMS to find the matching results for the user queries.

The method further comprises expanding the paths by path expansion rules to exploit cyclic relations such as self-loop, path-loop and subsumed-loop. The method further comprising providing cardinalities for relations to guide translation process. The method further comprising finding similar elements to the said user keywords by generating all possible paths and then consistently replacing elements bindings with concept bindings to generate new similar queries. The method further comprises dynamically discovering facets or information categories that support incremental user navigation from the nodes of convergence in the results of paths search. The facets are generated by indexing the number of distinct subject entities values to the distinct values for attributes and the distinct values of object entities associated to the subject entity through some predicate. The method further comprising ranking the results based on the number of elements replaced and the match between the kind of relations used in the generated query and relations connecting said user keywords.

Figure 2:
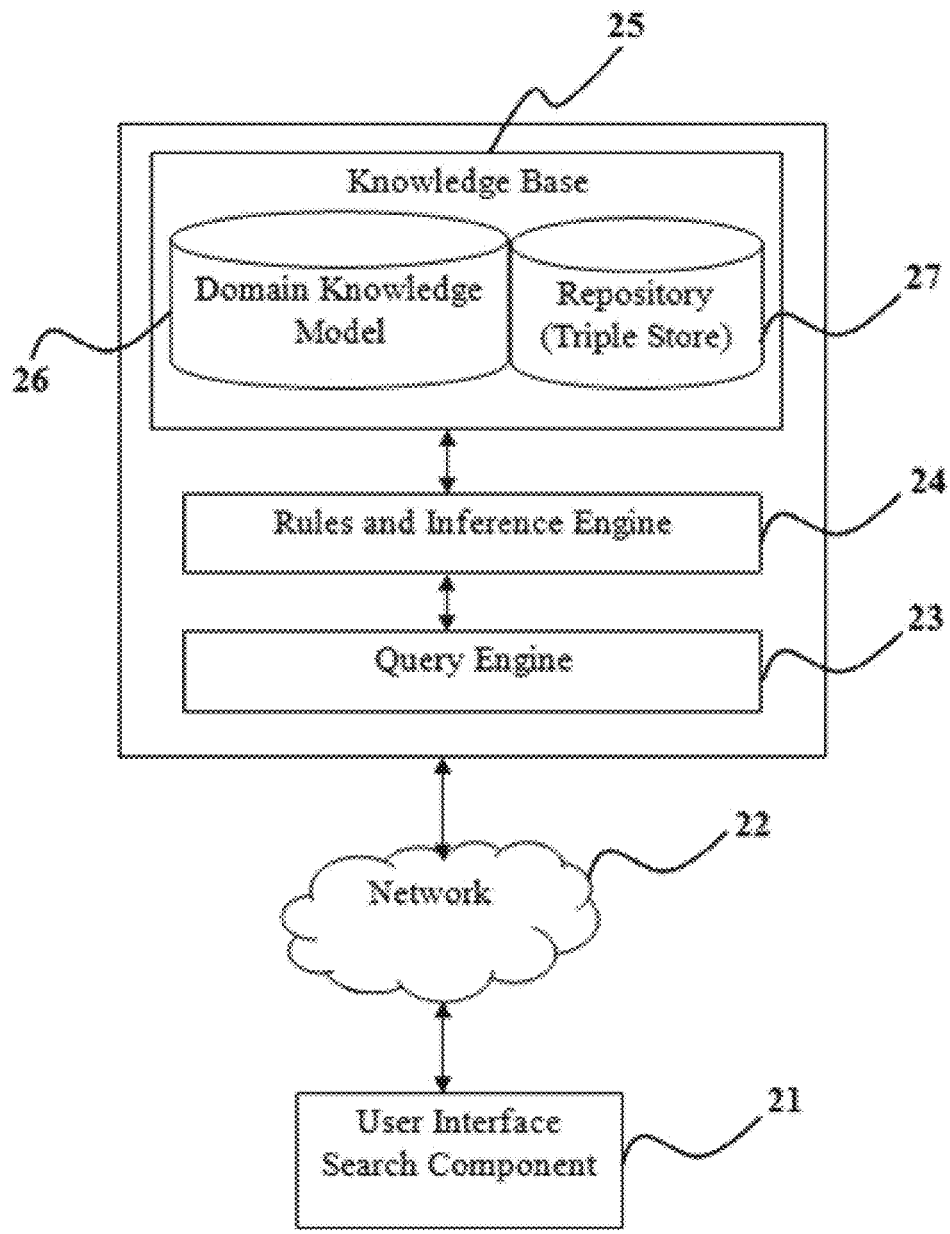
FIG. 2 shows a block diagram for translating user keywords into semantic queries based on domain vocabulary, according to embodiment of the present invention.

A system for translating user keywords into semantic queries based on a domain vocabulary is shown in FIG. 2. The system comprises a semantic repository 27 in a knowledge base 25 to store data as elements and triples or quads. A domain knowledge module 26 in a knowledge base 25 to capture background knowledge in domain using concepts, relations, roles and attributes. The domain knowledge module directly imports an existing ontology expressed in the OWL language or a taxonomy expressed in the SKOS language or import from custom XML representations by building custom adaptors. Rules and inference engine 24 to automatically expand a query term based on its semantic meaning and a query engine 23 to answer queries written in a structured query language. A search component 21 to accept keywords from users through a network 22 and maps said keywords with concepts and relations in said domain model, the search component 21 uses a graph search and a traversal patterns to find various paths through said domain model that connects user supplied keywords, the graphs are then converted in to valid queries and said queries are evaluated against said data; a user interface that captures input from the user and displays search results in multiple ways along with navigational aids based on dynamic faceting to enable users to drill down or refine the search results without having to re-enter the input and re-submit a search request.

The semantic repository 27 stores data as elements and triples or quads and manages large volume of data. The elements are defined as the individual instances of entities while the triples are relations that involve elements. The data is modeled as triples or quads where each triple models one relation. Each relation includes a subject element or URI, an object element or URI and a relation name or predicate. The data is stored in a semi-structured form without any schema.

The domain vocabulary component 26 captures the background knowledge in the vertical domain using concepts, relations, roles and attributes. The domain model is a machine processable description of the domain knowledge expressed as concepts, relations and a set of rules. The domain knowledge model may permit direct import of an existing Domain Ontology in OWL or SKOS. However, our system does not require all the features of a domain ontology like concept axioms in the web ontology Language (OWL) developed by the W3C for the semantic web. This may be required to drive inference. The present invention permits both opens-world and closed world assumption about how data should be interpreted over the domain models, concept expressions and how restrictions should be interpreted as constraints or conditions that must be satisfied by the data. This can be fixed either for each semantic repository or for each query submitted to the system.

The domain vocabulary is created using a graphical model creation tool or can also be automatically extracted from a given corpus of textual documents in the domain. The models extracted by automated tools serve as a starting point for domain experts to refine and enhance the domain model. The rules and inference engine 24 leverages subsumption/taxonomic relations in the domain model to automatically expand a query term based on its semantic meaning A search component 21 accepts simple keywords from users and maps them to concepts and relations in the domain model. The search component 21 relies on graph search and traversal patterns to find various paths through the domain model that connect the users supplied keywords. These paths are then converted into valid queries in SPARQL or other languages and the queries are evaluated against the data. The search components thus bridges the semantic gap between semantic repositories and user information needs by generating keywords into structured logical queries that leverage the domain knowledge and inference to provide precise answers. The system and method for translating user keywords in to semantic queries based on domain knowledge according to present invention provides accurate and more relevant search results.

Figure 3:
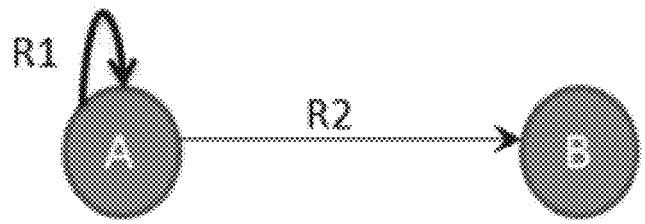
FIG. 3 shows a graph illustrating expansion of self-loop by using path expansion rules, according to embodiment of the present invention.

The concept graph will have numerous relations starting from a concept, some of them even have cyclic relations that is relating to the same concept. The embodiment of the invention discloses to exploit cyclic relations to generate paths by path expansion rules. The path expansion rules allow certain paths to be expanded in presence of cycles. According to embodiment of the present invention, the path expansion rules or patterns are provided in semantic search to create new path by exploiting the loop. The paths can be expanded through loops or through cardinalities. The loops are further classified in to self-loop, path-loop and Subsumed loop (Relation lifting). In self-loop, the concept is having a relationship with itself A graph illustrating expansion of self-loop by path expansion rules, is as shown in FIG. 3. The concept A is connected to concept B by relation R2 [A (R2) B]. A is further connected to itself by relation R1 [A (R1) A]. During simple graph traversal, it traverses only through R2 and will ignore R1, hence a care must be taken for self-loops as they can cause programs to end up in a permanent loop. According to present invention, self-loop R1 is used to generate expanded path called Level2 [A (R1) A (R2) B], where A, and B stand for concept names that may have numerous entities associated to them via the rd:typeOf relation. The expanded relation can be understood to start from A and uses R1 to reach another A entity, then using that A it goes through R2 to B resulting in Level 1 path [A (R1) A (R2) B]. 'A' refers to a concept and A(R1)A refers to a some relationship where the subject is any of the instances in the original starting set of A, but the object is typically any of the instances in A. The SPARQL query is generated for the path, and then the query language is searched in the triple store in semantic repository to find precise matching results for the user keywords. If the predicate R1 is cyclic in that it permits the same entity type to be the subject and the object of a triple then additional care must be taken during query generation to ensure that we retrieve only triples where the object is NOT the same as the subject.

If the User has specified some entity 'a' which is associated to type A and wants to find out some entity 'b' of type B. Then assume in the data 'a' is NOT connected to any B. There is no answer to the user keywords in this case. However according to the embodiment of this invention an expanded path is automatically generated using A R1 A self-loop to find other entities that 'a' is related to by the R1 relations. Assume that in the data 'a' is related to some 'aa' of type A and 'aa' is related to some 'b1' of type B. Then a - - - R1 - - - aa - - - R2 - - - b1 forms the answer to the user input. Hence it allows finding the non-obvious connections by using path expansion rules according to embodiment of the present invention.

Figure 4:
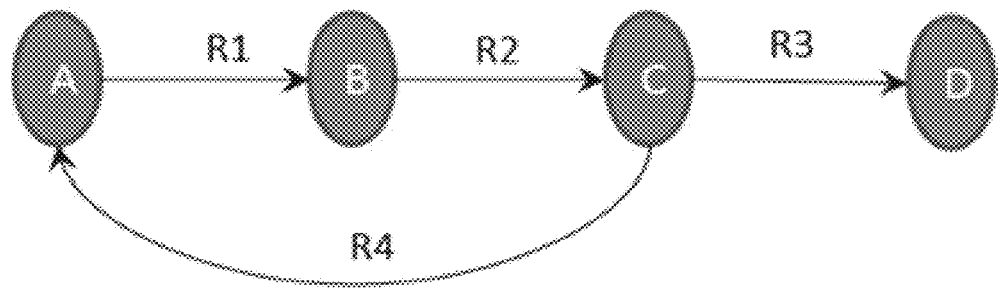
FIG. 4 shows a graph illustrating expansion of path-loop by using path expansion rules, according to embodiment of the present invention.

FIG. 4 shows a graph illustrating expansion of path-loop according to present invention. In path loop, there may not be an immediate loop to the concept. As shown in FIG. 4 starting from the first concept A the relationship R1 moves to the second concept B and from second concept B to the third concept C and from third concept C the relation R3 to fourth D. From third concept C the relation R4 comes back to the first concept A, this kind of relation which ends up in a cycle is called path loop. As shown in FIG. 4, the simple path found between concepts A to D are [A (R1) B (R2) C (R3) D]. The expanded path based on the path loop is [A (R1) B (R2) C (R4) A (R1) B (R2) C (R3) D]. According to present invention, the next level of expanded path (a level 2 expansion) is generated by using the path expansion rules to obtain [A (R1) B (R2) C (R4) A (R1) B (R2) C(R4) A (R1) B (R2) C (R3) D]. Hence the path expansion rule according to present invention allows finding the non-obvious connections for path loops at any depth or expansion level.

Figure 5:
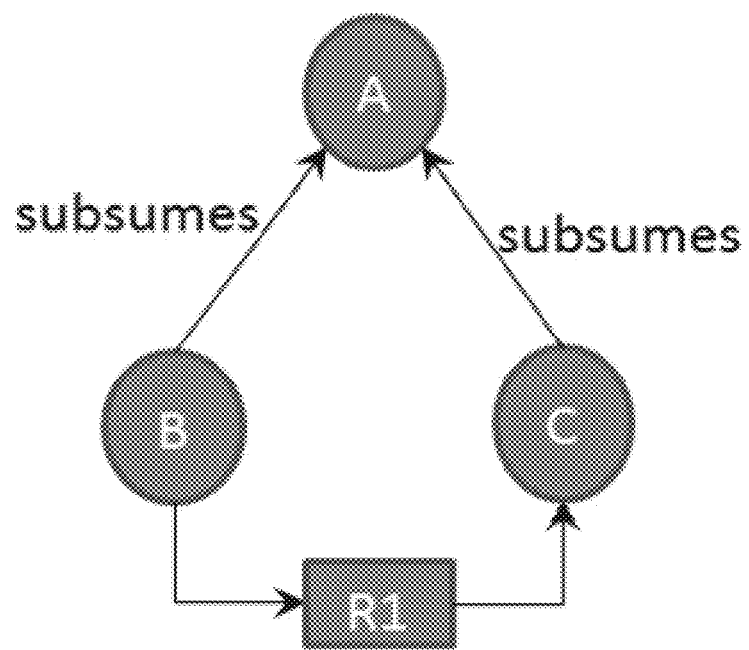
FIG. 5 shows a graph illustrating expansion of subsumed loop by using path expansion rules, according to embodiment of the present invention.

FIG. 5 shows a graph illustrating expansion of subsumed loop according to present invention. The subsumption relation is also known as the rdfs:subClassOf relation that relates a child concept which is more specific (restrictive) to a parent concept which is more general (inclusive). A more general concept is said to subsume a more specific concept. According to embodiment of present invention, the relation between two concepts in the subsumption hierarchy of same top level concept is treated like a self-loop. As shown in FIG. 5, concept B and concept C are sub-classes of A. Consider for example, the concept A is related to another concept X through relation R5 and from X to concept called F through relation R7. Then the path from A to F can be written as A (R5) X (R7) F. As there is a self-loop between concept A, B and C, using path expansion rules the path can be expanded as B (R1) C (R5) X (R7) F. The key idea is that since B and C are subclasses of A they can safely replace A in any path. Therefore the path from A to F can also be expressed as path from some B to some C (both are included in the A Type by the subclass definition) and from C to some X through R5 and from X to some F through R7.

Figure 6:
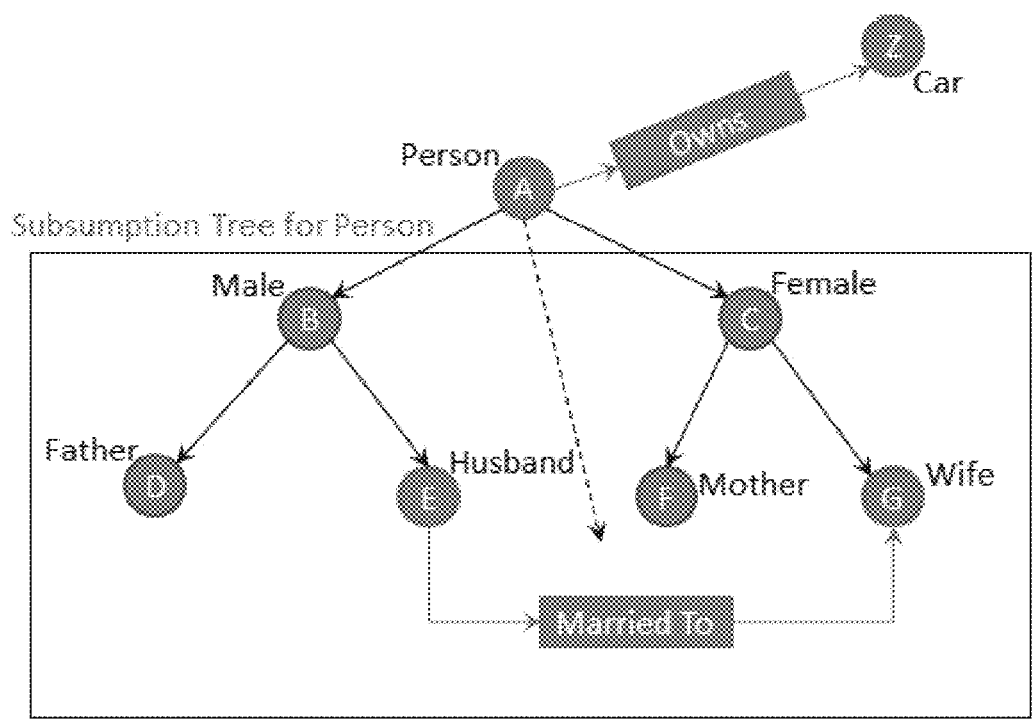
FIG. 6 shows a graph illustrating expansion of subsumption tree for a person, according to present invention.

FIG. 6 shows a graph illustrating expansion of subsumption tree for a person. Wherein MALE is a concept and FATHER and HUSBAND are two subsumed concepts. Similarly MOTHER and WIFE are two subsumed concepts of FEMALE. The married to relation relates HUSBAND to WIFE. Further MALE and FEMALE are itself subsumed concepts of a PERSON concept. The owns relation relates a PERSON to a CAR concept. According, to the subsumed loop idea proposed earlier the PERSON concept can be replaced with any of its subsumed concept and further expanded by using a named relations between two such subsumed concepts. So 'PERSON owns CAR' can first be replaced to the form 'HUSBAND owns CAR' and then expanded to the form "HUSBAND married to WIFE owns CAR". The expanded forms can then be translated to a SPARQL query, and evaluated a triple store to find matching results for the user keywords that are not straight forward answers but allow interesting explorations using related entities to the starting entity.

Figure 7:
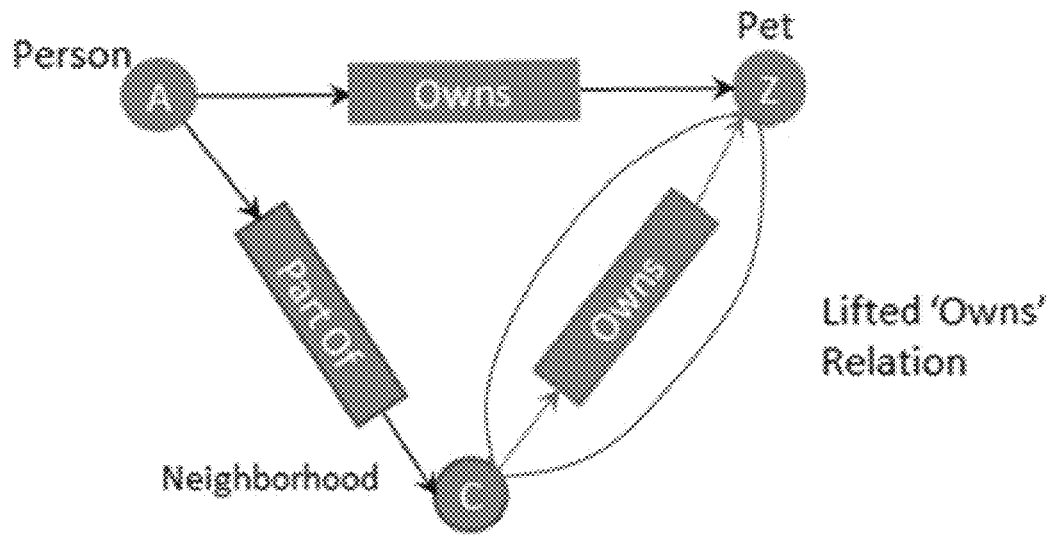
FIG. 7 shows a graph illustrating relation lifting, according to embodiment of the present invention.

FIG. 7 shows a graph illustrating a relation lifting, according to embodiment of the present invention. "Part of" is a special bootstrap relation with known semantics and expresses part-whole relations and in our definition is directed from the 'part' towards the 'whole' or meronym and needs special treatment in our invention. For any concept that is the source of a 'partOf' relation or any of its subsumed child relations, all other named relations on this concept ('owns' in this example) can be lifted to the object concept of the 'part of' relation. As shown in FIG. 7 the Person is the subject of 'Part of' and therefore the 'Person owns Pet' relation is lifted from Person to Neighborhood.

RDF triples present in the triple store are transformed by rolling-up the subjects and the objects into the associated RDF Types. If a Domain Ontology is available then the Ontology is consulted to determine the most appropriate set of Types that should be used during this roll up based on the top-most concept in the subsumption hierarchy and also considering any concept associated to the Relations in the Ontology as domain or range restrictions or concept inclusion axioms. For example if 'a' owns 'b' and a rdfs:typeOf Person, a rdfs:typeOf Teacher, and 'b' rdfs:typeOf Car represent 4 RDF triples. Then after the rollup transformation we have [Person owns Car]. In this example the subject type was rolled to Person rather than Teacher assuming [Teacher subsumes Person] was present in the Ontology.

During the RDF graph roll-up transformation, there are 4 different aggregate arithmetic counts that are computed for each relation type. These are 1) the total count of relations for each relation type 2) the count of relations for a given relation type and subject concept type 3) the count of distinct subjects for a given relation type and subject concept and object concept and 4) the count of distinct object types for a given relation type, subject concept and object concept. These counts are additional information added to the rolled-up type graph called the Catalog Concept graph. This Catalog Concept graph can be computed from any existing RDF triple data set and forms a vital data structure and component of our invention.

Figure 8:
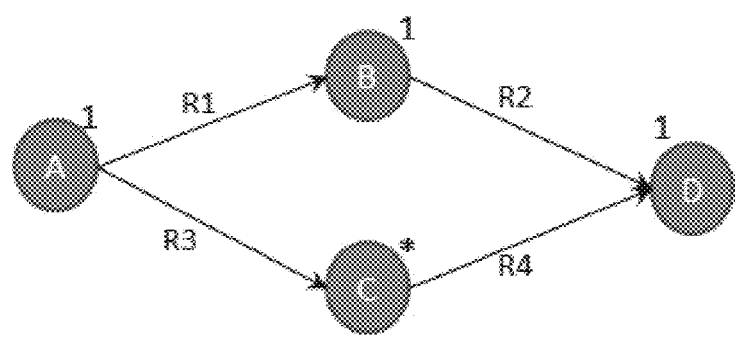
FIG. 8 shows a graph illustrating cardinality, according to embodiment of the present invention.

FIG. 8 shows a Catalog Concept graph without the counts illustrating a cardinality issue according to present invention. The cardinalities are inferred from an existing OWL ontology by checking whether the global property attributes for an OWL Property. We check whether a Property in the OWL Ontology is marked as a functional property (owl:functionalProperty) and/or Inverse Functional. For example A property that is marked Functional can be understood to have either Subject[1] - - - Object[1] or Subject[*] - - - Object[1] cardinality in the forward direction. If the property is also marked as Inverse Functional then it always has a forward and reverse cardinality of Subject[1] - - - Object[1]. In the absence of this information, we permit the manual human input directly into the Catalog Concept Graph to indicate the forward and inverse cardinality of predicates (relations) in the RDF triples. Thus we do not need OWL Ontologies for a system that is based on our invention but can always leverage one if it is available. A path which contains many-to-one cardinality between the subject and object concepts has low priority when compared with the path with one to one cardinality between the subject and object concepts. As shown in FIG. 8, the cardinality is attached to every node. The paths between A to D are path (1)=[A (R1) B (R2) D] and path (2)=[A (R3) C (R4) D]. The Path (1) is stronger than compared to Path (2). Therefore the path strength is inversely proportional to Cardinality.

Figure 9A:
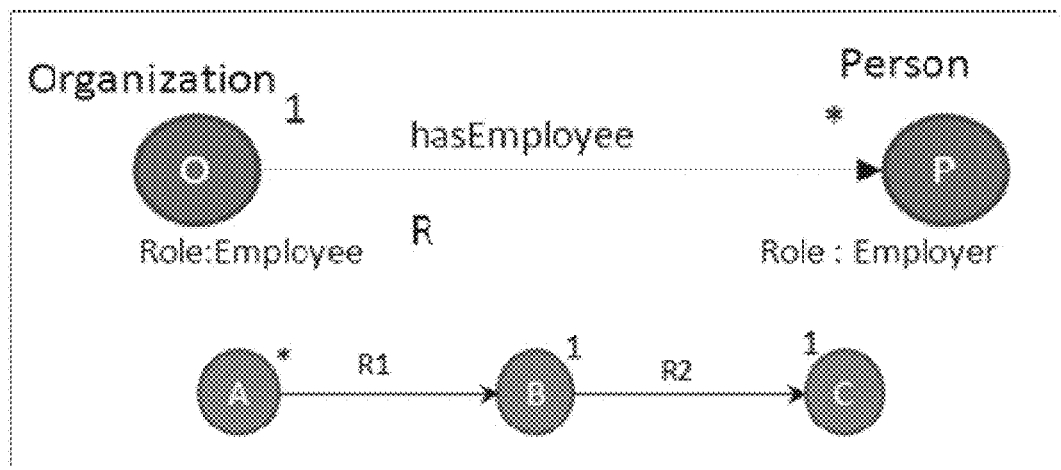
FIGS. 9a and 9b shows a graph illustrating Co-r relations, according to embodiment of the present invention.
Figure 9B:
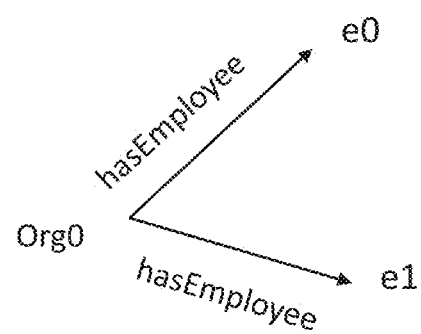

FIG. 9a shows graph illustrating a Co—R relations to expand paths according to embodiment of the present invention. For any RDF predicate or relation that has a forward cardinality of >1 (shown as * in the diagrams) we support the use of a higher-order predicate called Co—R where R is the basic Relation on which the higher-order predicate is based on. From FIG. 9a, there can be multiple elements of concept 'Person' related by the 'hasEmployee' to a single element of concept 'Organization' as shown in FIG. 9b. Where e0, e1 are the instances of Person and Org0 is the instance of Organization. In this case the higher-order predicate can be expressed as co-hasEmployee(Person, Person) between the target Concepts of the orginal R relation. Thus the Co—R higher order relations in this case allows us to express co-employers of a given Person without having to specify the specific Organization entity that the person is employed in. The Query Engine in this case will require a custom pre-preprocessing component that expands all such Co—R predicates into basic predicates.

Figure 10:
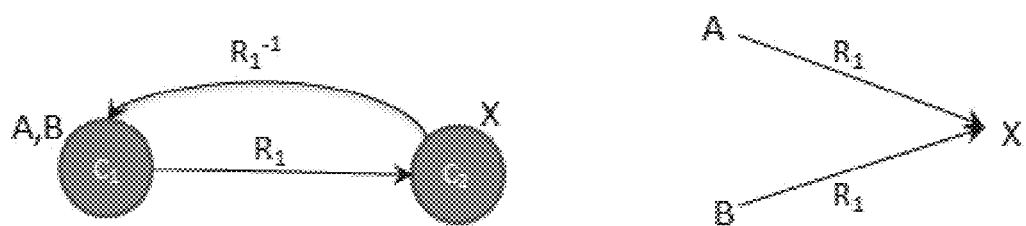
FIG. 10 shows a graph illustrating elements of same concepts in a similarity search, according to embodiment of the present invention.

The embodiment of the present invention provides mechanism to execute similarity search from knowledge bases. Similarity search in our current discussion is when the user specifies at least two entities and expects the system to find similar related pair of entities. Similarity Search is in this discussion of two basic variants, one when the user entities are of the same concepts or RDF Type and other when user entities are of different concepts or RDF Types. FIG. 10 shows a graph illustrating elements of same concept in a similarity search. Consider A, B is the instances of concept C1 and X is the instance of concept C2. Suppose user has entered two elements of concept C1 say A, B. Then the similar items for the given keywords A, B would be all other elements of concept C1 which are connected to element X (of concept C2) through relation R1. In other words this can easily be derived from the co-R predicate for the R1 relation. Here element X is first discovered by keyword semantic search. In order to obtain the specified output we need to follow a 2 step process. In the first step we will be finding whether the given inputs converge at a common element. In the second step we find other related elements connected to this common element by the same relation as the keywords.

Figure 11:
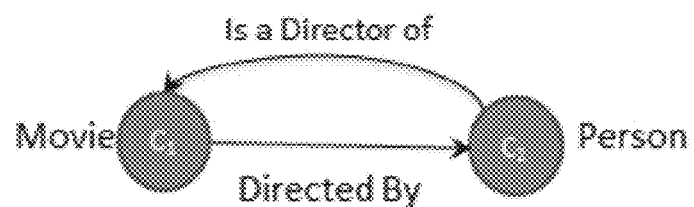
FIG. 11 shows a graph illustrating elements of different concepts in a similarity search, according to embodiment of the present invention.

FIG. 11 shows a graph illustrating the case of similarity search when the user entities are of different concepts or RDF Types., according to embodiment of the present invention. Suppose user has provided names of two entities of two different concepts (e.g. a movie name and a person name). The system finds paths between the given two elements using the Catalog Concept Graph. The results are typically tree shaped structures where the root of the tree represents the node of convergence and the leaf nodes represent the user input. To find similar items we transform the tree-shaped structure into a SPARQL or other semantic language queries supported by the triple store and replace the entity bindings for the keywords with concept bindings and fire the same query on the knowledge base.

Thus, the disclosed method and system translates user key words into precise access paths based on the information relationship described in conceptual entity relationship models and then converts these paths into logic based queries. It bridges the semantic gap between user keywords and logic based structured queries that represent the primary way of retrieving information from semantic representation of information. It enables users to interact with the semantic system that requires information requirements to be articulated in a structured query language since users prefer using simple keywords. It improves the relevance of search results by incorporating semantic technology to drive the mechanics of the search solution.

In another embodiment, faceted browsing is an exploration technique for structured datasets based on the facet theory. Facet theory is a systematic approach for coordinating theory and research. An exploratory interface may allow users to find information without a-priori knowledge of schema. An exploration technique may be necessary when a structure or schema of the data is unknown. In faceted browsing, information space may be partitioned using orthogonal conceptual dimensions of the data. These dimensions may be called facets. Each facet may represent an important characteristic of an information element. Further, the facet may have multiple restriction values and a user may select a restriction value to constrain relevant items in the information space. The facet theory may be directly mapped to navigation in semi-structured RDF data wherein information elements may RDF subjects, facets may be RDF predicates and restriction-values may be RDF objects.

Furthermore, step by step other restrictions may be applied to further constrain the information space. A faceted interface may have several advantages over keyword search or explicit queries. The faceted interface may allow exploration of an unknown dataset. The faceted interface may suggest restriction values at each step. The faceted interface may be a visual interface, removing the need to write explicit queries. Further, the faceted interface may prevent dead-end queries, by only offering restriction values that do not lead to empty results.

Older faceted browsing and navigation systems were designed to work with structured data. Older faceted browsing and navigation systems failed to analyze application of faceted browsing over semi-structured semantic data in RDF stores. Further, older faceted browsing and navigation systems assume a static pre-selected set of faceted dimensions for each entity type.

In older faceted browsing and navigation systems semantic data in RDF stores may be semi-structured and expressed in the form of triples with no schema. Additionally, OWL ontology may provide additional conceptual knowledge but cannot be assumed to always accompany RDF data. OWL ontology may be a methodology to process information. Therefore, in older faceted browsing and navigation systems, static faceted definitions for RDF data may not always be possible. Also, in static faceted definitions for RDF data may not be desired since RDF data without schema loses its flexibility due to the static faceted definitions for RDF data.

In one or more embodiments, to overcome the difficulties in older faceted and navigation browsing systems, a set of statistics on an RDF data may be computed. The set of statistics may be used as a catalogue for RDF data. The catalogue may be leveraged to dynamically select and rank faceting dimensions for various entity types in the RDF data. Ranked faceting dimensions may then be stored similar to a static facet definition. Thus, definitions may automatically re-computed whenever there is an update to the RDF data. Further, definitions may also be computed whenever there is a need. Therefore, human intervention may not be necessary to initiate computation of definitions.

Further, exploratory browsing, navigation and filtering on semantic repositories and/or knowledge bases may be enabled without the need for users to have any previous understanding of the data. Also, RDF data may be analyzed without an accompanying OWL ontology.

In one or more embodiments, facets may indicate concepts and/or classes in an Ontology and/or RDf Types in an RDF graph. For each concept, multiple facets may be present. Multiple facets of a concept may be called facet dimensions. In RDF these are the predicates that may be incident on this concept whether as a subject and/or as an object. Under each facet, there may be a set of distinct values available in the RDF data. Selectivity ratio is a metric that may rank facet dimensions based on statistics computed from the RDF data. Properties with smaller ratios may be better than those with higher values. Any self-loop property where the subject type and the object type are the same may be ignored from this computation. Selectivity ratio may be calculated to string data types.

In an example embodiment, numeric and date time properties in RDF data ranges may be used to navigate and filter the data without computing the selectivity ratio. String property with a selectivity ratio zero may be ignored from the task of selecting facets.

Facet Coverage may describe the validity of a facet for the data set at that point in time. Coverage of a relation $R_i$ on some object type $T_j$, $C_{R_iT_j}$ may be a ratio of distinct instances of $T_j$ present as the subject in $R_i$ relations to the Total number of $T_j$ instances=$|SubjectOf(T_j, R_i)|/|T_j|$ For example, in FIG. 2 a data set describing information about scientists and researchers may be browsed, and considering an 'alma mater' relation between a Scientist and a University, the scientist has graduated from. The coverage of 'alma mater' as a facet for Scientist may be measured as the ratio of the number of distinct scientists that may be subjects of the 'alma mater' relation to the total number of scientists in the data set.

The higher the coverage indicates that the relation may be more suitable as a facet candidate for that Object type (scientist in this case). A low coverage may mean that there is not enough data in a candidate relation to be considered.

Facet Quality may be a measure of the effectiveness of a facet to help a user narrow down on a small subset of the data for some known object type under consideration. A high quality facet if selected helps the user to manage the information overload by filtering data outside the facet and focusing on a smaller dataset. The quality may be interpreted as the inverse of the selectivity ratio that is measured.

Selectivity Ratio of a relation $R_i$ on some object type $T_j$, $S_{R_iT_j}$ is the ratio of distinct facet values (the objects) in $R_i$ to the number of distinct instances of $T_j$ present as the subject in $R_i$=$|ObjectOf(T_j, R_i)|/|SubjectOf(T_j, R_i)|$ Quality may be the inverse of the selectivity ratio that is used to rank facets. From FIG. 3, the predicate 'Alma Mater' is ranked higher than the predicate 'BirthPlace' for object type 'Scientist' because the selectivity ratio for 'AlmaMater' is lower (hence quality is higher) is lower than that of 'BirthPlace'.

In an example embodiment, if there are n instances of a concept and n' of those n instances have a property a1. Then coverage for rdf property a1 may be n'/n. And if there are vo values for objects for those n' attribute relations and |T| represents the distinct object (target) values in a1. Similarly if |S| represents the distinct count of subjects in a1 then selectivity ratio n for a1 property is =|T|/|S|. Fecate Quality=1/Selectivity=|S|/|T|.

Figure 12A:
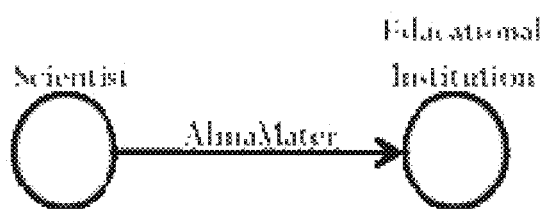
FIGS. 12A-12C show flowcharts illustrating embodiments of the present invention.
Figure 12B:
Figure 12C:
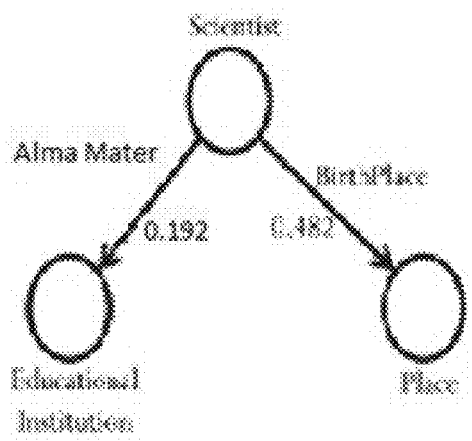

In an example embodiment shown in FIGS. 12A-C, consider a concept scientist. Assume there are 984 different universities in which scientists studied. And there are 5110 different scientists who went to a given University. Then Selectivity Ratio for the 'Alma Mater' property between Scientists and Educational Institutions may be calculated as shown below.

$$\text{Ratio} = \frac{|T|}{|S|} = \frac{984}{5110} = 0.192$$

Similarly Birth-place may be another property between Scientists and a Location $$\text{Ratio} = \frac{|T|}{|S|} = \frac{3020}{6266} = 0.482$$

From the above, 'Alma Mater' may be better suited as a facet dimension for concept 'Scientist' than 'BirthPlace' in this data set. Thus, facets may be ranked for concepts in a RDF data set with any prior knowledge. Further, facets may be computed again when the data changes.

The RDF Graph may be extracted to indirect Facets. Consider the scenario described earlier in FIG. 2 where data about scientists is being studied. To facilitate faceted browsing of this dataset potential relations in the RDF data set may be examined. One relation between a Scientist and the University from where they have graduated may be found. Unfortunately, it turns out the name of the University may not be an effective facet for navigating through the dataset on Scientists.

However, by exploring the RDF graph further for predicates on University it may be found that 'University' is related to 'Country' through 'located In' predicate. We then consider whether 'Country' may be an effective indirect facet for object type 'Scientist' by computing the coverage and quality. One level of indirect facets may be considered to keep the processing time for facet selection within acceptable limits.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

What is claimed is:

1. A method for translating user keywords into semantic queries, the method comprising;
   receiving, by at least one of the one or more computers, keywords;
   searching, by the at least one of the one or more computers, a conceptual model to identify one or more concepts relevant to the keywords;
   transforming, by the at least one of the one or more computers, at least a portion of the conceptual model into a connected graph;
   automatically generating, by the at least one of the one or more computers and without user input, at least one path through the connected graph using at least one path expansion rule, the at least one path connecting the one or more concepts;
   identifying and ranking, by the at least one of the one or more computers, facets that support incremental user navigation from nodes of convergence in the at least one path, wherein the facets are generated at least in part by indexing a number of distinct values for attributes of the one or more concepts;
   generating, the by at least one of the one or more computers, at least one structured semantic query from the at least one path with the identified and ranked facets; and
   executing, by the at least one of the one or more computers, the at least one structured semantic query on a semantic repository.

2. The method according to claim 1, wherein the semantic respiratory contains domain knowledge modelled by n-ary relations, where an n-ary relation is a relation dependent on n conditions, n>1.

3. The method according to claim 1, wherein the conceptual model comprises resource description framework (RDF) as a data model; the method further comprising:
   summarizing, by the at least one of the one or more computers, RDF data in a resource description framework schema (RUE'S) or an ontology web language (OWL) type class to obtain summarized RDF data;
   generating, by the at least one of the one or more computers, a summarized RDF type graph; and
   interconnecting, by the at least one of the one or more computers, the summarized RDF type graph with the concept model.

4. The method according to claim 1, wherein each of the at least one path is ranked based on a number of hops or edges in the path.

5. The method according to claim 1, wherein the at least one path expansion rule is a self-loop, a path-loop, or a subsumed-loop or requires applying one or more cardinalities to the relations between concepts.

6. The method according to claim 1, further comprising executing, by the at least one of the one or more computers, a structured search in the semantic repository to identify elements based on the one or more concepts, wherein the one or more concepts are two or more concepts, and wherein searching the conceptual model further identifies one or more relations between the two or more concepts, and wherein the at least one structured semantic query is generated to comprise elements related by the one or more relations.

7. A computing device for translating user keywords into semantic queries, comprising at least one processor operatively coupled to a memory storing instructions which when executed by the at least one processor cause the at least one processor to:
   receive keywords;
   search the conceptual model to identify one or more concepts relevant to the keywords;
   transform at least a portion of the conceptual model into a connected graph;
   automatically generate, without user input, at least one path through the connected graph using at least one path expansion rule, the at least one path connecting the one or more concepts;
   identify and rank facets that support incremental user navigation from nodes of convergence in the at least one path, wherein the facets are generated at least in part by indexing a number of distinct values for attributes of the one or more concepts;
   generate at least one structured semantic query from the at least one path with the identified and ranked facets; and
   execute the at least one structure semantic query on a semantic repository.

8. The method according to claim 1, wherein the instructions when executed by the at least one processor further cause the at least one processor to generate at least one path connecting the concepts through the connected graph based on one or more relations having maximum coverage of the concepts.

9. The computing device according to claim 7, wherein the semantic repository contains domain knowledge modelled by n-ary relations, where an n-ary relation is a relation dependent on n conditions, n>1.

10. The computing device according to claim 7 wherein the conceptual model comprises resource description framework (RDF) as a data model, and the instructions when executed by the at least one processor further cause the at least one processor to:
   summarize RDF data in a resource description framework schema (RDFS) or an ontology web language (OWL) type class to obtain summarized RDF data; and generate, a summarized RDF type graph; and interconnect the summarized RDF type graph with the concept model.

11. The computing device according to claim 7, wherein each of the at least one paths is ranked based on a number of hops or edges in the path.

12. The computing device according to claim 7, wherein the at least one path expansion rule is a self-loop, a path-loop, or a subsumed-loopor requires applying cardinalities to relations between concepts.

13. The computing device according to claim 7, wherein the instructions when executed by the at least one processor further cause the at least one processor to:
  execute a structured search in the semantic repository to identify elements based on the one or more concepts, wherein the one or more concepts are two or more concepts; and
  identifying one or more relations between the two or more concepts, wherein the at least one structured semantic query is generated to comprise elements related by the one or more relations.

14. A non-transitory computer readable medium having stored thereon instructions for translating user keywords into semantic queries the instructions comprising executable code which, when executed by at least one processor, causes the processor to:
  receive keywords;
  search the conceptual model to identify one or more concepts relevant to the keywords;
  transform at least a portion of the conceptual model into a connected graph;
  generate at least one path through the connected graph, the at least one path connecting the one or more concepts;
  identify and rank facets that support incremental user navigation from nodes of convergence in the at least one path, wherein the facets are generated at least in part by indexing a number of distinct values for attributes of the one or more concepts;
  generate at least one structured semantic query from the at least one path with the identified and ranked facets; and
  execute the at least one structure semantic query on a semantic repository.

15. The computing device according to claim 7, wherein the instructions when executed by the at least one processor further cause the at least one processor to generate at least one path connecting the concepts through the connected graph based on one or more relations having maximum coverage of the concepts.

16. The non-transitory computer readable medium of claim 14, wherein the semantic repository contains domain knowledge modelled by n-ary relations, where an n-ary relation is a relation dependent on n conditions, n>1.

17. The non-transitory computer readable medium of claim 14, the conceptual model comprises resource description framework (RDF) as a data model and the executable code, when executed by the processor, further causes the processor to:
  summarize RDF data in a resource description framework schema (RDFS) or an ontology web language (OWL) type class to obtain summarized RDF data; and
  generate, a summarized RDF type graph; and interconnect the summarized RDF type graph with the concept model.

18. The non-transitory computer readable medium of claim 14, wherein each of the at least one paths is ranked based on a number of hops or edges in the path.

19. The non-transitory computer readable medium of claim 14, wherein the at least one path expansion rule is a self-loop, a path-loop, or a subsumed-loop or requires applying cardinalities to relations between concepts.

20. The non-transitory computer readable medium of claim 14, wherein the executable code, when executed by the processor, further causes the processor to:
  execute a structured search in the semantic repository to identify elements based on the one or more concepts, wherein the one or more concepts are two or more concepts; and
  identifying one or more relations between the two or more concepts, wherein the at least one structured semantic query is generated to comprise elements related by the one or more relations.

21. The non-transitory computer readable medium of claim 14, wherein the executable code, when executed by the processor, further causes the processor to generate at least one path connecting the concepts through the connected graph based on one or more relations having maximum coverage of the concepts.

* * * * *